United States Patent
Petruk

(10) Patent No.: US 7,819,664 B2
(45) Date of Patent: Oct. 26, 2010

(54) WIND TUNNEL FOR TRAINING PARACHUTISTS

(76) Inventor: Victor Borisovich Petruk, St. Trostyanetskaya 6-b ap. 62, Kyiv (UA) 02091

( * ) Notice: Subject to any disclaimer, the term of this patent is extended or adjusted under 35 U.S.C. 154(b) by 474 days.

(21) Appl. No.: 11/988,602

(22) PCT Filed: Jun. 29, 2006

(86) PCT No.: PCT/UA2006/000042

§ 371 (c)(1),
(2), (4) Date: Jan. 11, 2008

(87) PCT Pub. No.: WO2007/008184

PCT Pub. Date: Jan. 18, 2007

(65) Prior Publication Data

US 2010/0137069 A1   Jun. 3, 2010

(30) Foreign Application Priority Data

Jul. 12, 2005   (UA) ................................. 200506866

(51) Int. Cl.
G09B 19/16   (2006.01)
(52) U.S. Cl. .......................................................... 434/59
(58) Field of Classification Search ................... 434/29, 434/30, 48, 49, 53, 54, 59; 273/49, 130, 273/137

See application file for complete search history.

(56) References Cited

U.S. PATENT DOCUMENTS 3,484,953 A * 12/1969 Norheim, Jr. ................ 434/258
4,578,037 A * 3/1986 Macangus et al. ........... 434/258
5,593,352 A * 1/1997 Methfessel et al. ............ 472/50
5,655,909 A * 8/1997 Kitchen et al. ................ 434/44
5,753,811 A * 5/1998 Consolini ..................... 73/147
6,000,942 A * 12/1999 Hogue et al. .................. 434/30
6,083,110 A * 7/2000 Kitchen et al. ................ 472/49
6,315,672 B1 * 11/2001 Gillot et al. ................... 472/50
6,805,558 B1 * 10/2004 Carl et al. .................... 434/258
6,813,595 B2 * 11/2004 Edgar ............................ 703/8
6,929,480 B2 * 8/2005 Lee et al. ..................... 434/258
7,153,163 B2 * 12/2006 Lewis et al. ............. 439/620.11
7,524,189 B2 * 4/2009 Delalande ..................... 434/59
2006/0105300 A1   5/2006 Moinel Delalande

FOREIGN PATENT DOCUMENTS

FR    2843940   3/2005
JP    2152486   6/1990
RU    2203718   5/2003

* cited by examiner

*Primary Examiner*—Kurt Fernstrom
(74) *Attorney, Agent, or Firm*—Aleksandr Smushkovich

(57) ABSTRACT

A wind tunnel is provided usable for training of sportsmen-parachutists and entertainment purposes. The tunnel comprises a channel, including sequentially arranged and interconnected components: an input confusor, a first working zone, an intermediate confusor, and a second working zone. The working zones are shaped as diffusers, having different longitudinal flow speed gradients, so that the working zone having the lesser longitudinal speed gradient is shorter, whereas the working zone having the greater longitudinal speed gradient is longer. A honeycomb is arranged between the working zones. The entrances and exits of the working zones are equipped with safety nets. The structural design of the tunnel makes it possible to simultaneously train parachutists for team acrobatics and artistic types of parachuting under conditions, maximally adapted to a given type of training, thereby improving a training quality and substantially increasing the tunnel's cost effectiveness.

9 Claims, 1 Drawing Sheet

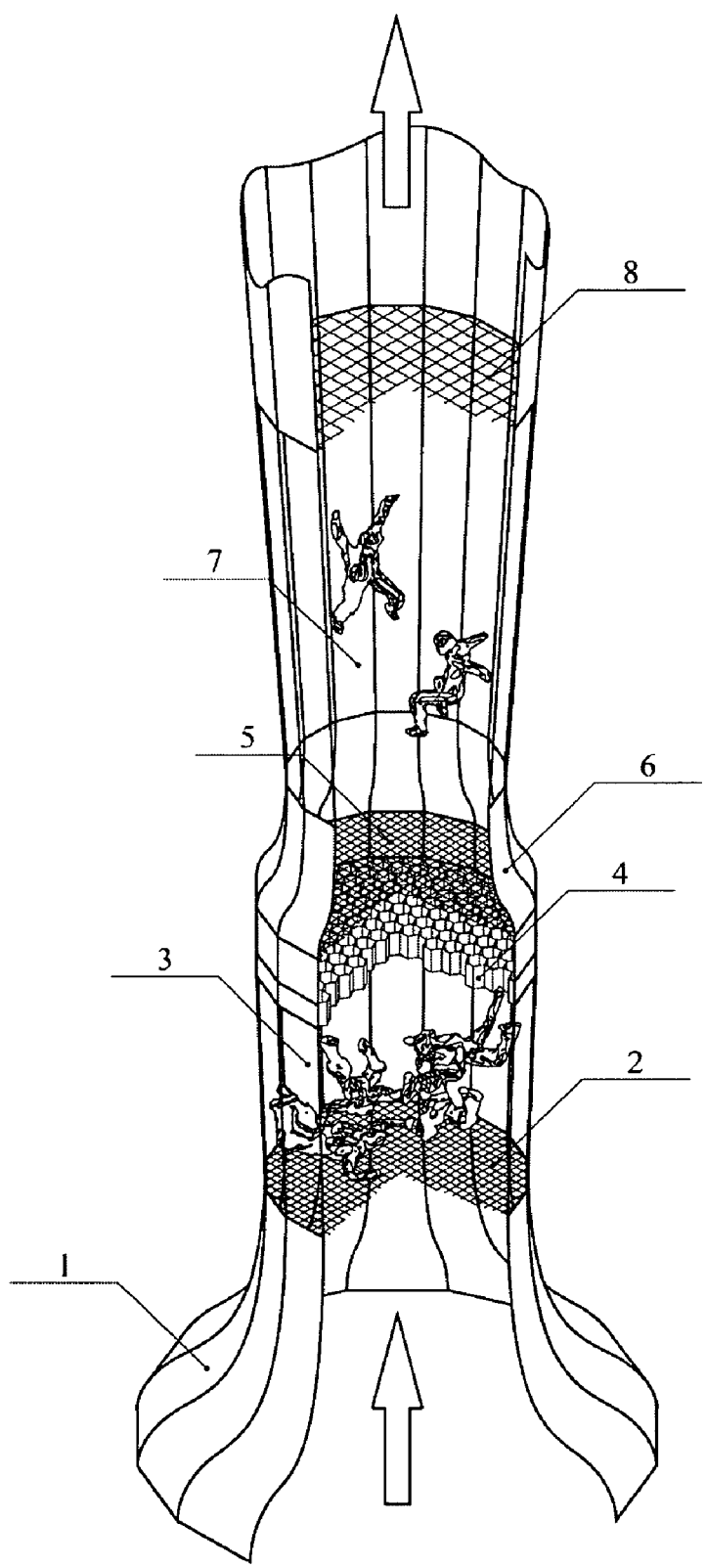
FIG.

WIND TUNNEL FOR TRAINING PARACHUTISTS

CROSS-REFERENCE TO RELATED APPLICATIONS

This application is a U.S. national phase application of a PCT application PCT/UA2006/000042 filed on 29 Jun. 2006, published as WO2007008184, whose disclosure is incorporated herein in its entirety by reference, which PCT application claims priority of a Ukrainian patent application UA2005/06866 filed on 12 Jul. 2005.

FIELD OF THE INVENTION

The invention relates to aerodynamics, particularly to wind tunnels and can be used as training equipment for parachutists and for entertainment.

BACKGROUND OF THE INVENTION

The known parachuting disciplines related to free fall can be divided into those that are performed with a constant rate of fall (about 50-55 m/s) and with a variable rate of fall (approximately within 45-70 m/s). The first ones include group acrobatics and beginner parachutist training (acquisition of stable fall skills). The second ones include artistic forms of the parachuting, such as: 'free fly', 'free style' and others.

For an effective training of a parachutist or of a group of parachutists in the working of the wind tunnel, it is necessary that the air-resistance force applied to the parachutist's body be equal to the force of his/her weight. Otherwise, the inequality of the mentioned forces will cause a longitudinal displacement of the parachutist along the axis of the flow and his/her exiting the working zone or encountering the safety net due to the limited working.

The most reasonable solution to keep the parachutist or group of parachutists within the working is to design the working as a diffuser with an entrance velocity corresponding approximately to the upper limit of the fall velocity range and an exit velocity corresponding approximately to the lower limit of the fall velocity range.

At the same time, due to the negative gradient of the velocity flow along the axis of the working, self-stabilization the body's position occurs, i.e. the body is positioned at a level within the working zone, where the influencing air-resistance force equals to its weight. The change of the master cross-section or of the air-resistance coefficient (in case of the position change) causes the body's transfer to a new equilibrium level.

It is known training equipment for parachutists with a diffuser-type working, possessing a velocity rate within 45-70 m/s, (see Reference-1). The working of the given training equipment comprises two sections, between which sections a net can be placed.

During the performing of artistic parachuting exercises, the sections separating net is not placed, and the parachutists can move from the lower to the upper limits of the working.

When performing the group acrobatic exercises or during the beginner training of the parachutists, the net is placed and the parachutists exercise in the upper half of the working, in the section, where the velocity of flow is approximately 50 m/s.

The main disadvantage of this equipment is unsatisfactory quality of the flow in the second section that negatively influences the quality of the group acrobatics teams' training and causes the habituation to harmful reflexes, which affect negatively the teams' results in performing the parachute jumps. It is based on three reasons:

Firstly, for speeding-up the performing of some group acrobatics figures, the spinning of parachutists is executed in such a way that one parachutist passes under the body of another parachutist, so during their rearranging the parachutists are on different levels, but at the moment of transition they move with the same vertical velocities.

When performing such a transition in the working of the wind tunnel with a longitudinal gradient of velocity, the parachutist who flies up higher appears within the section where the flow speed and, correspondingly, the dynamic pressure are less; whereas the parachutist who descends lower appears in the section where the flow speed and, correspondingly, the dynamic pressure are greater. To compensate the flow velocity change, the upper parachutist has to increase the master cross-section of his/her body and the lower parachutist has to diminish it, correspondingly. The intensive trainings in the wind tunnel lead to the situation when the mentioned actions to compensate the dynamic pressure change become reflex.

When performing the parachute jump in the free air, the longitudinal gradient is absent and the established reflex habit for its compensation by the increase or decrease of the body's master cross-section causes that during the spinning performance with crossing planes the upper parachutist ascends higher than it is needed and the lower parachutist descends lower than the required level, that leads to vertical dispersion of the parachutists and, consequently, worsens the results.

Secondly, the presence of the initial diffuser section causes the velocity profile change, the boundary layers thicken and the steady speed core diminishes. The velocity profile becomes convex-shaped. At the same time a greater dynamic pressure influences the part of the body that is closer to the flow's axis and a lesser dynamic pressure influences the part of the body which is further from the flow's axis. It produces the twisting moment, which changes the body's angle of incidence that causes a deviation of the resultant aerodynamic force towards the flow's periphery, and, in consequence of this, the lateral component of the resultant aerodynamic force pushes out the body to the flow's periphery. This lateral force equals zero on the axis of the flow and increases while moving away from the axis.

Thirdly, resulting from the diffuser having an opening angle, flow velocity vectors' directions within the working section are not parallel. In the centre of the working the flow velocity vector is parallel to the gravity force vector, whereas next to the working wall, there is an angle between the flow velocity vector and gravity force vector, which angle equals a half of the diffuser opening angle. Correspondingly, the resultant aerodynamic force for a symmetric body is directed strictly upwards in the centre of the working and angularly in the periphery zone. The more the body comes closer to the working wall the greater is that angle. That's why, the lateral force acts upon a body situated out of the axis of the flow, which lateral force pushes out the body to the periphery of the flow. This lateral force equals zero on the axis of the flow and increases while moving away from the axis.

As a result of adding the lateral forces mentioned above, an effect of working on a spherical surface appears, when the body is constantly going to "slide" towards the working wall.

To compensate the mentioned effect, the parachutists make their body to incline in relation to the working direction. The intensive trainings in the wind tunnel lead to the situation when the mentioned actions to compensate the lateral force become reflex. When performing the parachute jump in the free air the lateral force is absent, and the established reflex habit for its compensation by inclining the body to the centre of the group result in that the team works too densely, "bunches up", that negatively affects the results of its performance.

One more disadvantage of the mentioned training equipment is excessive hydraulic losses when working in the upper section of the working, because the lower diffuser section unused at this time, the lower safety net, and the honeycomb, placed in the narrowest section of the channel, are the main sources of the hydraulic losses.

The mentioned disadvantages can be eliminated by designing parachutists training equipment, which comprises two working zones, each one adapted for the most effective training for every parachuting type.

The working zone, designed for group acrobatics and beginner training exercise of parachutists, has to possess a minimum length of the initial section and a minimum negative velocity gradient. The length of such working zone is, correspondingly, relatively short (about one caliber), and the opening angle is about a few degrees (0.5-5°).

A small longitudinal velocity gradient in the working zone reduces the required compensation of the dynamic pressure change on the different levels when performing the spinning with planes crossing. A relatively small length of the working zone excludes increasing the boundary layer to a significant thickness and helps maintaining a steady speed core, whose dimensions are close to the diameter of the working zone that eliminates a first component of the lateral force. A relatively small opening angle of the working zone reduces the deviation of the resultant aerodynamic force on the periphery of the flow that decreases a second component of the lateral force.

The working zone, designed for artistic parachuting exercising, has to possess corresponding velocity rates at the entrance and at the escape zones, and the length of the working zone must amount to about 2-4 calibers at an opening angle ranging from 5 to 10°. The presence of the velocity gradient and the lateral force gradient is less critical in this case, while the velocity rate is decisive, and thusly the length of the working zone and the opening angle are chosen taking into consideration the minimization of hydraulic losses in the wind tunnel contour and technological limitations.

The mentioned working zones may be placed in the training equipment contour in parallel, sequentially, or they may be removable. The most effective is the sequential design of the working zones.

Known is parachutists training equipment with several working zones, placed sequentially on one axis (see Reference 2).

The main disadvantage of the mentioned equipment is the placement of ventilators (i.e. fans creating an air pressure difference) in the sections of the channels between working zones and the absence of elements, which can equalize the velocity distribution at the entrance of the working zones. A necessary element of the ventilator is a bushing that in the modern ventilators has a diameter from 0.4 to 0.7 of the channel's diameter, wherein the ventilator is installed. This bushing creates a considerably wide and long wake (trace).

The presence of the ventilator bushing's wake in the working zone makes the valid training impossible, because getting of the parachutist into the wake, where the dynamic pressure is lower than in the main flow, will cause his/her fall on the safety net. On the other hand, movement of the parachutist within the working zone without getting into the wake is practically impossible, because it occupies a significant part of the working zone's diameter. Moreover, the ventilators' bushings, placed in the sections close to the working zones' sections by their areas, with taking into account the flow's squeezing on the bushing, will become sources of significant hydraulic losses.

The mentioned disadvantages can be eliminated by creating a wind tunnel, whose channel doesn't contain elements, worsening the steadiness of the velocity distribution that causes local flow turbulences and creates significant hydraulic losses.

The most technically close to the proposed technical solution is a wind tunnel, designed for aerodynamic research (see Reference-3, page 177), comprising a channel created by sequentially placed and interconnected: an entrance contraction (confusor), a first working zone, an intermediate contraction, and a second working zone.

The main disadvantage of the mentioned wind tunnel is the impossibility to train simultaneously in both working zones (since elements, excluding the getting of the models wake from the first working zone into the second working zone, are absent), resulting in the researches are made in the working zones separately, taking turns.

Therefore, while the research is conducted in one working zone, the flow also passes through the other working zone, not used at the moment, and creates additional unwanted losses, especially in case of working within the first working zone, because the additional squeezing in the intermediate contraction, with the following braking in the contraction after the second working zone increases significantly common hydraulic losses in the contour.

A disadvantage of the mentioned wind tunnel, related to the sportsmen parachutists training, are the absence of a velocity gradient in the working zones (the velocity in the steady speed core is the same in any working zone's crossing).

Another disadvantage is the impossibility of simultaneous work of the parachutists in the first and in the second working zones, resulting from the significantly different velocities. So, if an equilibrium velocity rate is set in the first working zone, in the second working zone this rate will be greater than the equilibrium, hence the parachutists will be pushed out by the excessive dynamic pressure to the diffuser, or will be pressed against an upper safety net (if its installation is arranged). If the equilibrium rate is set in the second working zone, the rate in the first working zone will be less than the equilibrium, thus the parachutists will fall into the entrance diffuser, or will fall on the lower safety net (if its installation is arranged).

BRIEF DESCRIPTION OF THE INVENTION

Considering the prior art devices and their disadvantages, the problem to be solved by the inventive solution was to develop a wind tunnel design for training parachutists, which would feature working zones providing flow parameters, optimally adapted to perform group acrobatics and artistic parachuting training, and would provide the simultaneous training of parachutists in both working zones.

The aforesaid problem is solved by providing the following design: the inventive wind tunnel comprises a channel, created by sequentially installed and interconnected: an entrance confusor (contraction element), a first working zone, an intermediate confusor, and a second working zone. The working zones are performed in a diffuser shape, with different longitudinal velocity gradients.

The working zone with a less longitudinal velocity gradient is made shorter, and the working zone with a greater longitudinal gradient is made longer. The working zone with the greater longitudinal velocity gradient comprises, at least, one section, perpendicular to the axis of the flow, whose area equals to the area of the entrance section of the working zone with the less longitudinal velocity gradient. The working zone with the less longitudinal velocity gradient is installed after the entrance confusor, and the working zone with the greater longitudinal gradient is installed after the intermediate confusor.

At the exit of the first working zone a honeycomb is installed. At the entrance to the first working zone, at the entrance to the intermediate confusor, and at the exit of the second working zone safety nets are placed. The section area of the channel in the place of connection of the intermediate confusor and the second working zone is chosen in such a way that to prevent the parachutists from falling down from the second working zone into the intermediate confusor in case of the normal drive operation (the velocity in the section is about 80 m/s).

Therefore, the inventive wind tunnel for the parachutists training contains the sequentially installed: the entrance confusor, entrance safety net, the first working zone, the honeycomb, the intermediate safety net, the intermediate confusor, the second working zone and the exit safety net. The working zones are performed as diffusers, with different longitudinal flow velocity gradients, wherein the working zone with the less longitudinal velocity gradient is shorter, and the working zone with the greater longitudinal velocity gradient is longer.

The distinguishing features of the closest analog are: —application of the working zones, performed as diffusers, with different longitudinal flow velocity gradients; —the presence within the working zone with the greater longitudinal velocity gradient of at least one section, perpendicular to the axis of the flow, whose area equals to the area of the entrance section of the working zone with the less longitudinal velocity gradient; —the use of the honeycomb at the exit of the first working zone; —the use of the safety nets.

The diffuser type working zones allow to maintain the parachutist or a group of parachutists within the working zone while he/she (they) changes (change) the air-resistance coefficient and one's body master cross-section when performing the maneuvers, by self-stabilization without any outside control.

The different longitudinal velocity gradients allow for creating in every working zone the flow with optimal characteristics for the specific type of parachuting. The presence in the working zone with the greater longitudinal velocity gradient of at least one section perpendicular to the axis of the flow, whose area equals the area of the entrance section of the working zone with the less longitudinal velocity gradient, allows to maintain the equilibrium rate in both zones simultaneously, and, correspondingly, allows the parachutists to train in both working zones simultaneously.

The location of the working zone with the less longitudinal velocity gradient before the working zone with the greater longitudinal velocity gradient allows improving the flow quality for the parachutists exercising the group acrobatics, (they are more sensitive to the flow heterogeneity) and making more effective the confusor that decreases the velocity distribution heterogeneity proportionally to the square of squeezing (the ratio of the entrance section area to the exit section area).

The honeycomb at the exit of the first working zone diminishes the turbulence scale, the twisting and the flow angularity, created by the parachutists exercising in the first working that improves the flow quality at the entrance to the second working zone and allows training in both working zones simultaneously.

The safety nets improve the security of the wind tunnel trainings, especially in case of a sudden drive cutout and, moreover, the intermediate safety net additionally equalizes partially the flow's velocity distribution at the entrance to the intermediate confusor and, correspondingly, at the entrance to the second working zone.

The combination of the mentioned known and unknown features makes it possible to train simultaneously the group acrobatics parachutists and artistic parachuting exercising under optimal adapted conditions for a specific training type that allows improving the quality of the trainings and significantly increasing the economic effectiveness of the wind tunnel.

PREFERRED EMBODIMENT OF THE INVENTION

While the invention may be susceptible to embodiment in different forms, there is shown in an appended drawing figure (FIG.), and will be described in detail herein, a specific embodiment of the present invention, with the understanding that the present disclosure is to be considered an exemplification of the principles of the invention, and is not intended to limit the invention to that as illustrated and described herein.

The concept of the invention is graphically illustrated on the FIG. in the form of a diagram of the inventive wind tunnel.

The wind tunnel comprises: an entrance confusor 1, an entrance safety net 2, a first working zone 3, a honeycomb 4, an intermediate safety net 5, an intermediate confusor 6, a second working zone 7 and an exit safety net 8.

The wind tunnel operates in the following way: a ventilator set (it is not depicted on the FIG.) creates a pressure differential, which causes the air to move within the tunnel contour upward. In the entrance confusor 1 the air acceleration and the velocity distribution equalization takes place.

In the first working zone 3 the parachutists exercise the group acrobatics or undergo the beginner training. At that time the flow velocity distribution is destabilized, the parachutists' bodies create the wake, and their displacements cause the mentioned angularity and the flow twisting.

In the honeycomb 4, the turbulence, the twisting, and the flow angularity are diminished. At the intermediate safety net 5 the partial equalizing of the velocity distribution takes place. In the intermediate confusor 6 an acceleration and a partial equalizing of the velocity distribution also occur.

Moreover, at the segment between the working sections of the first and the second working zones, a natural equalizing of the velocity distribution occurs owing to air viscosity and turbulent exchange. In the second working zone 7 the artistic parachuting exercising takes place.

Furthermore, as the second working zone is of a diffuser type, the flow braking and partial equalizing of the resultant full pressure take place, and thereafter the air is either ejected into the atmosphere (if the wind tunnel has an opened contour) or comes back into the return channel and flows back into the entrance confusor 1 (if the wind tunnel has a closed contour).

In case of a sudden drive cutout, the parachutists, exercising in the first working zone lower themselves onto the entrance safety net, and the parachutists exercising in the second working zone descend onto the intermediate safety net.

REFERENCES

1. French Patent—FR 2 843 940-A1, MPK B64D23/00 2002.
2. Japanese Patent—JP 2 152486, MPK A63G31/00, B64D23/00, G09B9/00 1990.

3. Central Aero-hydro-dynamic Institute Researches, Issue No. 2059, 'Research of Experimental Aero-dynamic Installations Elements', Moscow, CAGI, 1980, p. 177.

The invention claimed is:

1. A wind tunnel for training parachutists capable to provide an air flow, said tunnel comprising
a channel including:
an entrance confusor,
a first working zone,
an intermediate confusor,
a second working zone, and
a number of safety nets placed within the channel;
wherein said entrance confusor, first working zone, intermediate confusor, and second working zone being sequentially installed and interconnected; wherein
said tunnel characterized in that the working zones performed in a diffuser shape with different longitudinal flow velocity gradients wherein the working zone with the less of said gradients made shorter and including an entrance section, the working zone with the greater of said gradients made longer; and the working zone with the greater gradient including at least one section perpendicular to the axis of the air flow and whose area equals to the area of said entrance section.

2. The wind tunnel according to claim 1, wherein the working zone with the less gradient installed after the entrance confusor and the working zone with the greater gradient installed after the intermediate confusor.

3. The wind tunnel according to claim 1, further including a honeycomb additionally installed at the exit of the first working zone.

4. The wind tunnel according to claim 1, wherein one of said safety nets installed at the entrance into the first working zone.

5. The wind tunnel according to claim 1, wherein one of said the safety nets installed at the entrance into the intermediate confusor.

6. The wind tunnel according to claim 1, wherein one of said safety net installed at the exit of the second working zone.

7. The wind tunnel according to claim 3, wherein one of said safety nets installed at the entrance into the first working zone.

8. The wind tunnel according to claim 3, wherein one of said safety nets installed at the entrance into the intermediate confusor.

9. The wind tunnel according to claim 3, wherein one of said safety nets installed at the exit of the second working zone.

* * * * *